United States Patent
Liu et al.

(10) Patent No.: US 12,491,893 B2
(45) Date of Patent: Dec. 9, 2025

(54) METHOD AND SYSTEM FOR CONSTRUCTING PREDICTIVE VEHICLE DRIVING CONDITION, DEVICE AND MEDIUM THEREOF

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Yu Liu, Tianjin (CN); Yongkai Liang, Tianjin (CN); Xianglei Zhu, Tianjin (CN); Hanzhengnan Yu, Tianjin (CN); Jingyuan Li, Tianjin (CN); Zhengjun Yang, Tianjin (CN); Xiaopan An, Tianjin (CN); Xi Hu, Tianjin (CN); Kunqi Ma, Tianjin (CN); Hang Xu, Tianjin (CN); Hao Zhang, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 19/007,147

(22) Filed: Dec. 31, 2024

(65) Prior Publication Data

US 2025/0296576 A1   Sep. 25, 2025

(30) Foreign Application Priority Data

Mar. 22, 2024   (CN) .......................... 202410329775.7

(51) Int. Cl.
B60W 50/00   (2006.01)

(52) U.S. Cl.
CPC ..... *B60W 50/0097* (2013.01); *B60W 2520/10* (2013.01); *B60W 2556/10* (2020.02); *B60W 2556/20* (2020.02)

(58) Field of Classification Search
CPC ......... B60W 50/0097; B60W 2520/10; B60W 2556/10; B60W 2556/20
See application file for complete search history.

(56) References Cited

U.S. PATENT DOCUMENTS 12,162,513 B2 * 12/2024 Kobilarov .......... G01C 21/3453
12,168,449 B2 * 12/2024 Pankov ............... B60W 40/105
(Continued)

FOREIGN PATENT DOCUMENTS

| CN | 111832225 A | 10/2020 |
|---|---|---|
| CN | 113222385 A | 8/2021 |

(Continued)

OTHER PUBLICATIONS

Bozorgi et al.: "A Time and Energy Efficient Routing Algorithm for Electric Vehicles Based on Historical Driving Data", Nov. 2017, https://www.researchgate.net/publication/320953773_A_Time_and_Energy_Efficient_Routing_Algorithm_for_Electric_Vehicles_Based_on_Historical_Driving_Data (Year: 2017).*

*Primary Examiner* — Daniel M. Robert

(57) ABSTRACT

The present disclosure discloses a method and system for constructing a predictive vehicle driving condition, a device and a medium. The method includes: acquiring a first road set and historical vehicle driving data; screening distances less than or equal to a distance threshold from the first distance set, generating a road point-in-time set; sequencing a plurality of point-in-time corresponding to the same road segment, and cutting at two adjacent point-in-time with a time difference greater than a time threshold, to obtain a plurality of road segments; establishing road segment databases; screening segments with segment feature data meet- (Continued)

ing a second preset condition from all the road segment databases, and generating a road-condition segment set; and sequencing a plurality of condition segments corresponding to each road segment, and screening condition segments meeting a third preset condition from all the segment sequences, to generate an optimal driving condition.

10 Claims, 6 Drawing Sheets

(56) References Cited

U.S. PATENT DOCUMENTS

| | | | |
|---|---|---|---|
| 2013/0179007 A1* | 7/2013 | Dalum | H01M 10/48 |
| | | | 701/2 |
| 2014/0257608 A1* | 9/2014 | Dufford | B60W 20/12 |
| | | | 903/930 |
| 2015/0275788 A1* | 10/2015 | Dufford | B60W 50/0097 |
| | | | 701/1 |
| 2024/0159551 A1* | 5/2024 | Wray | G01C 21/3807 |
| 2024/0253623 A1* | 8/2024 | Olin | B60W 30/143 |

FOREIGN PATENT DOCUMENTS

| | | | | |
|---|---|---|---|---|
| CN | 114771542 A | | 7/2022 | |
| DE | 102008035944 B4 * | | 12/2012 | ........ B60W 50/0098 |

* cited by examiner

| Time | Time interval(s) | Longitude | Latitude | Speed |
|---|---|---|---|---|
| 2022/11/17:34:06 | 1 | 117.173191 | 39.105997 | 41.1 |
| 2022/11/17:34:07 | 1 | 117.173195 | 39.106099 | 40.7 |
| 2022/11/17:34:08 | 1 | 117.173199 | 39.106102 | 40 |
| 2022/11/17:34:09 | 1 (Segment 1) | 117.173204 | 39.10005 | 39.3 |
| 2022/11/17:34:10 | 1 | 117.173218 | 39.10638 | 38.7 |
| 2022/11/17:34:11 | 1 | 117.173217 | 39.106473 | 38.1 |
| 2022/11/17:34:12 | 1 | 117.173217 | 39.106574 | 38.8 |
| 2022/11/17:50:24 | 36972 | 117.173217 | 39.106678 | 39.8 |
| 2022/11/17:50:25 | 1 | 117.173216 | 39.106781 | 40.1 |
| 2022/11/17:50:26 | 1 (Segment 2) | 117.17322 | 39.106678 | 49.9 |
| 2022/11/17:50:27 | 1 | 117.173223 | 39.106781 | 49.3 |
| 2022/11/17:50:28 | 1 | 117.173228 | 39.107071 | 38.5 |
| 2022/11/17:50:29 | 1 | 117.173231 | 39.107163 | 37.9 |
| 2022/11/18:00:17 | 310188 | 117.172941 | 39.102535 | 42.3 |
| 2022/11/18:00:18 | 1 | 117.172937 | 39.102425 | 42.9 |
| 2022/11/18:00:19 | 1 | 117.172931 | 39.102314 | 43.8 |
| 2022/11/18:00:20 | 1 (Segment 3) | 117.172934 | 39.102199 | 44.6 |
| 2022/11/18:00:21 | 1 | 117.172951 | 39.10208 | 46.1 |
| 2022/11/18:00:22 | 1 | 117.17297 | 39.102199 | 46.7 |
| 2022/11/18:00:23 | 1 | 117.172991 | 39.10208 | 47.7 |
| 2022/11/18:00:24 | 1 | 117.173004 | 39.101716 | 48.2 |
| 2022/11/18:00:25 | 1 | 117.172992 | 39.10159 | 49.4 |
| 2022/11/18:00:26 | 1 | 117.172973 | 39.101462 | 50 |
| 2022/11/18:00:27 | 1 | 117.172956 | 39.101335 | 50.5 |
| 2022/11/18:00:28 | 1 | 117.172945 | 39.101209 | 50.2 |
| 2022/11/18:00:29 | 1 | 117.172934 | 39.101089 | 49.6 |
| 2022/11/18:00:30 | 1 | 117.172927 | 39.100969 | 49.2 |
| 2022/11/18:00:31 | 1 | 117.172926 | 39.100849 | 48.9 |

FIG. 6

METHOD AND SYSTEM FOR CONSTRUCTING PREDICTIVE VEHICLE DRIVING CONDITION, DEVICE AND MEDIUM THEREOF

CROSS-REFERENCE TO RELATED APPLICATION

This application claims priority from the Chinese patent application 2024103297757 filed Mar. 22, 2024, the content of which is incorporated herein in the entirety by reference.

TECHNICAL FIELD

The present disclosure generally relates to the technical field of vehicles, in particular to a method and system for constructing a predictive vehicle driving condition, a device and a medium thereof.

BACKGROUND ART

A predictive vehicle driving condition refers to predicting a vehicle driving condition based on a position of an origin before departure. At present, methods for predicting the vehicle driving condition mainly include a method based on a Kalman filter model, a linear regression model, a Markov chain method and the like.

However, these traditional prediction methods merely consider one type of data, either historical driving data or real-time driving data. Moreover, the traditional prediction methods involve complex and cumbersome computations during the prediction process, which increases the likelihood of errors, resulting in low accuracy of final prediction results. Thus, a method and system for constructing a predictive vehicle driving condition, a device and a medium are provided to solve the above problems.

SUMMARY OF THE DISCLOSURE

In view of the above defects or shortcomings in the prior art, the present disclosure provides a method and system for constructing a predictive vehicle driving condition, a device and a medium thereof, which can improve prediction accuracy and effectively support improvement in a vehicle driving range prediction algorithm and calibration optimization of a predictive vehicle energy management strategy.

In a first aspect, the present disclosure provides a method for constructing a predictive vehicle driving condition, including the following steps:

acquiring a first road set of a planned route from a map navigation system of a vehicle and retrieving historical vehicle driving data stored in the map navigation system, wherein the first road set at least includes a plurality of road segments identified by a global positioning system (GPS) and corresponding parameter data; and the historical vehicle driving data at least includes a plurality of point-in-time and corresponding driving data;

calculating first distances from longitudes and latitudes of the point-in-time to all roads in the first road set, measured by a satellite for the GPS to obtain a first distance set, and meanwhile, screening distances less than or equal to a distance threshold from the first distance set, to obtain a second distance set; generating a road-point-in-time set according to the second distance set identified by the GPS, wherein the road-point-in-time set at least includes a plurality of road segments and a plurality of point-in-time corresponding to each road segment;

sequencing a plurality of point-in-time corresponding to the same road segment in the road-point-in-time set according to a time sequence, to obtain a data sequence, meanwhile, traversing the data sequence, and cutting at two adjacent point-in-time with a time difference greater than a time threshold, to obtain a plurality of road segments corresponding to a current road;

establishing a road segment database of the same road segment according to the segments meeting a first preset condition in the road segment, wherein the road segment database at least includes a plurality of road segments and corresponding segment feature data;

screening segments with the segment feature data meeting a second preset condition from all the road segment databases, to generate a road-condition segment set, wherein the road-condition segment set at least includes a plurality of road segments and a plurality of condition segments corresponding to each road segment; and sequencing a plurality of condition segments corresponding to each road segment in the road-condition segment set according to a sequence from a high confidence level to a low confidence level, to obtain a plurality of segment sequences, and meanwhile, screening condition segments meeting a third preset condition from all the segment sequences, to generate an optimal driving condition; and outputting the optimal driving condition to a display and applying the optimal driving condition to drive the vehicle.

According to the technical solution provided by the present disclosure, after obtaining the plurality of segment sequences and before screening the condition segments meeting the third preset condition from all the segment sequences, the method further includes the following steps:

sequencing the roads according to the planned route, to obtain a road sequence; and screening the condition segments meeting the third preset condition from all the segment sequences according to the road sequence; wherein the third preset condition is defined as follows: a speed difference between the condition segments of two adjacent road segments is less than a preset speed difference.

According to the technical solution provided by the present disclosure, the screening the condition segments meeting the third preset condition from all the segment sequences according to the road sequence, specifically includes the following steps:

selecting a road corresponding to a position of an origin of the planned route from the road sequence, to serve as an initial traversal road;

acquiring a segment with a maximum chi-square value confidence level from the segment sequence corresponding to the initial traversal road, to serve as an initial segment;

traversing the segment sequence of the road connected with the initial traversal road, if a segment satisfies that the speed difference between the segment and the initial segment is less than a preset speed difference, designating the segment as a connected segment; if such segment that the speed difference between the segment and the initial segment is less than the preset speed difference is not found, acquiring a new initial segment from the segment sequence corresponding to the initial traversal road again, and searching for a new connected segment again according to the new initial segment;

designating a road corresponding to the connected segment as a new initial traversal road, and searching for a new connected segment again; and repeatedly executing the above steps, to obtain the condition segments meeting the third preset condition from all the segment sequences.

According to the technical solution provided by the present disclosure, the acquiring a first road set of a planned route from a map navigation system of a vehicle, specifically includes the following steps:

acquiring an initial road set of the planned route from a map navigation system of a vehicle, wherein the initial road set at least includes a plurality of road segments and parameter data corresponding to each road segment identified by a global positioning system (GPS), and the parameter data at least includes a length;

traversing the initial road set, and labeling roads with lengths less than a first threshold as first-type roads; labeling roads with lengths greater than or equal to the first threshold as second-type roads;

normalizing all the first-type roads and roads connected with the first-type roads, calculating a first Euclidean distance and a second Euclidean distance between the normalized first-type roads and roads connected with the first-type roads, and selecting roads corresponding to the smaller Euclidean distance in the first Euclidean distance or the second Euclidean distance for combination, to obtain a plurality of segments of combined roads; meanwhile, denoting non-combined first-type roads as third-type roads; and generating the first road set according to the combined roads, the third-type roads and the second-type roads.

According to the technical solution provided by the present disclosure, the first preset condition is as follows:

a difference between a segment orientation angle of the road segment and an orientation angle of a road corresponding to the road segment is less than a first difference, a difference between a segment length of the road segment and a length of the road corresponding to the road segment is less than a second difference, and a difference between a mean vehicle speed of the road segment and a mean vehicle speed of the road corresponding to the road segment is less than a third difference.

According to the technical solution provided by the present disclosure, the segment feature data at least includes: a mean speed of the segment, a mean acceleration of the segment, a mean deceleration of the segment and a confidence level of a speed-acceleration distribution. The second preset condition is as follows:

A difference between the mean speed of the road segment and a mean speed of the road corresponding to the road segment is less than a fourth difference, a difference between the mean acceleration of the road segment and a mean acceleration of the road corresponding to the road segment is less than a fifth difference, a difference between the mean deceleration of the road segment and a mean deceleration of the road corresponding to the road segment is less than a sixth difference, and the confidence level of the road segment is greater than a preset confidence level.

According to the technical solution provided by the present disclosure, the confidence level of the speed-acceleration distribution is acquired according to the following steps:

calculating a chi-square value of the speed-acceleration distribution;

acquiring a corresponding chi-square distribution database according to a freedom degree of the speed-acceleration distribution; wherein the chi-square distribution database at least includes a plurality of chi-square values and corresponding confidence levels; and searching the confidence level corresponding to data associated with the chi-square values in the chi-square distribution database, which serves as the confidence level of the speed-acceleration distribution.

In a second aspect, the present disclosure provides a system for constructing a predictive vehicle driving condition, which can achieve the above method for constructing the predictive vehicle driving condition, and includes:

a data acquisition module, configured to acquire a first road set of a planned route from a map navigation system of a vehicle and retrieving historical vehicle driving data stored in the map navigation system; wherein the first road set at least includes a plurality of road segments identified by a global positioning system (GPS) and corresponding parameter data; and the historical vehicle driving data at least includes a plurality of point-in-time and corresponding time;

a data processing module, configured to calculate first distances from point-in-time of the historical vehicle driving data stored in the map navigation system to all roads in the first road set, identified by a global positioning system (GPS) to obtain a first distance set, and meanwhile, screen distances less than or equal to a distance threshold from the first distance set, to obtain a second distance set; and generate a road-point-in-time set according to the second distance set identified by the GPS; wherein the road-point-in-time set at least includes a plurality of road segments and a plurality of point-in-time corresponding to each road segment;

the data processing module, further configured to sequence a plurality of point-in-time corresponding to the same road segment in the road-point-in-time set according to a time sequence, to obtain a data sequence, meanwhile, traverse the data sequence, and cut at two adjacent point-in-time with a time difference greater than a time threshold, to obtain a plurality of road segments corresponding to a current road;

the data processing module, further configured to establish a road segment database of the road segment according to the segments meeting a first preset condition in the same road segment; wherein the road segment database at least includes a plurality of road segments and corresponding segment feature data;

the data processing module, further configured to screen segments with the segment feature data meeting a second preset condition from all the road segment databases, to generate a road-condition segment set; wherein the road-condition segment set at least includes a plurality of road segments and a plurality of condition segments corresponding to each road segment; and the data processing module, further configured to sequence a plurality of condition segments corresponding to each road segment in the road-condition segment set according to a sequence from a high confidence level to a low confidence level, to obtain a plurality of segment sequences, and meanwhile, screen condition segments meeting a third preset condition from all the segment sequences, to generate an optimal driving condition; and outputting the optimal driving condition to a display and applying the optimal driving condition to drive the vehicle.

In a third aspect, the present disclosure further provides an electronic device, including a memory, a processor and computer programs stored on the memory and capable of running on the processor. When implementing the computer programs, the processor implements the steps of the above method for constructing the predictive vehicle driving condition.

In a fourth aspect, the present disclosure provides a computer readable storage medium on which computer programs are stored, and when the computer programs are executed by a processor, the steps of the above method for constructing the predictive vehicle driving condition are implemented.

In conclusion, the present disclosure discloses a specific flow of the method for constructing the predictive vehicle driving condition. According to the present disclosure, the distances from the longitudes and latitudes of the point-in-time of the historical vehicle driving data stored in the map navigation system to all roads in the first road set are calculated based on the acquired first road set of the planned route from a map navigation system of a vehicle and retrieving historical vehicle driving data stored in the map navigation system to obtain the first distance set, and meanwhile, the distances less than or equal to the distance threshold are screened from the first distance set, to obtain the second distance set; the road-point-in-time set is generated according to the second distance set identified by the GPS; the plurality of point-in-time corresponding to the same road segment in the road-point-in-time set are sequenced according to the time sequence, to obtain the data sequence; meanwhile, the data sequence is traversed, cutting is performed at two adjacent point-in-time with the time difference greater than the time threshold, to obtain the plurality of road segments corresponding to the current road; the road segment database of the road segment is established according to the segments meeting the first preset condition in the same road segment; the segments with the segment feature data meeting the second preset condition are screened from all the road segment databases, to generate the road-condition segment set; and the plurality of condition segments corresponding to each road segment in the road-condition segment set are sequenced according to the sequence from the high confidence level to the low confidence level, to obtain the plurality of road segments, and meanwhile the condition segments meeting the third preset condition are screened from all the segment sequences, to generate the optimal driving condition; and outputting the optimal driving condition to a display and applying the optimal driving condition to drive the vehicle.

According to the present disclosure, the first road set of the planned route from a map navigation system of a vehicle and retrieving the historical vehicle driving data stored in the map navigation system are combined, such that richer reference information is provided for constructing the vehicle driving condition, moreover, during the process of constructing the optimal driving condition, the road segment database corresponding to each road segment is finally generated by combining some roads, and cutting and screening the road segments. This results in more streamlined data in the road segment databases, which significantly reduces the calculation load and error rate during the construction process, and ensures that the final optimal driving condition is more accurate, thus achieving the objective of improving predictive accuracy. Consequently, the improvement in the vehicle driving range prediction algorithm and the predictive vehicle energy management strategy are effectively supported.

BRIEF DESCRIPTION OF THE DRAWINGS

By reading the detailed descriptions made to the nonrestrictive embodiments with reference to the following drawings, other features, purposes and advantages of the present disclosure will be more apparent.

FIG. 6 is a schematic diagram of showing the road segment cutting.

Figure 1:
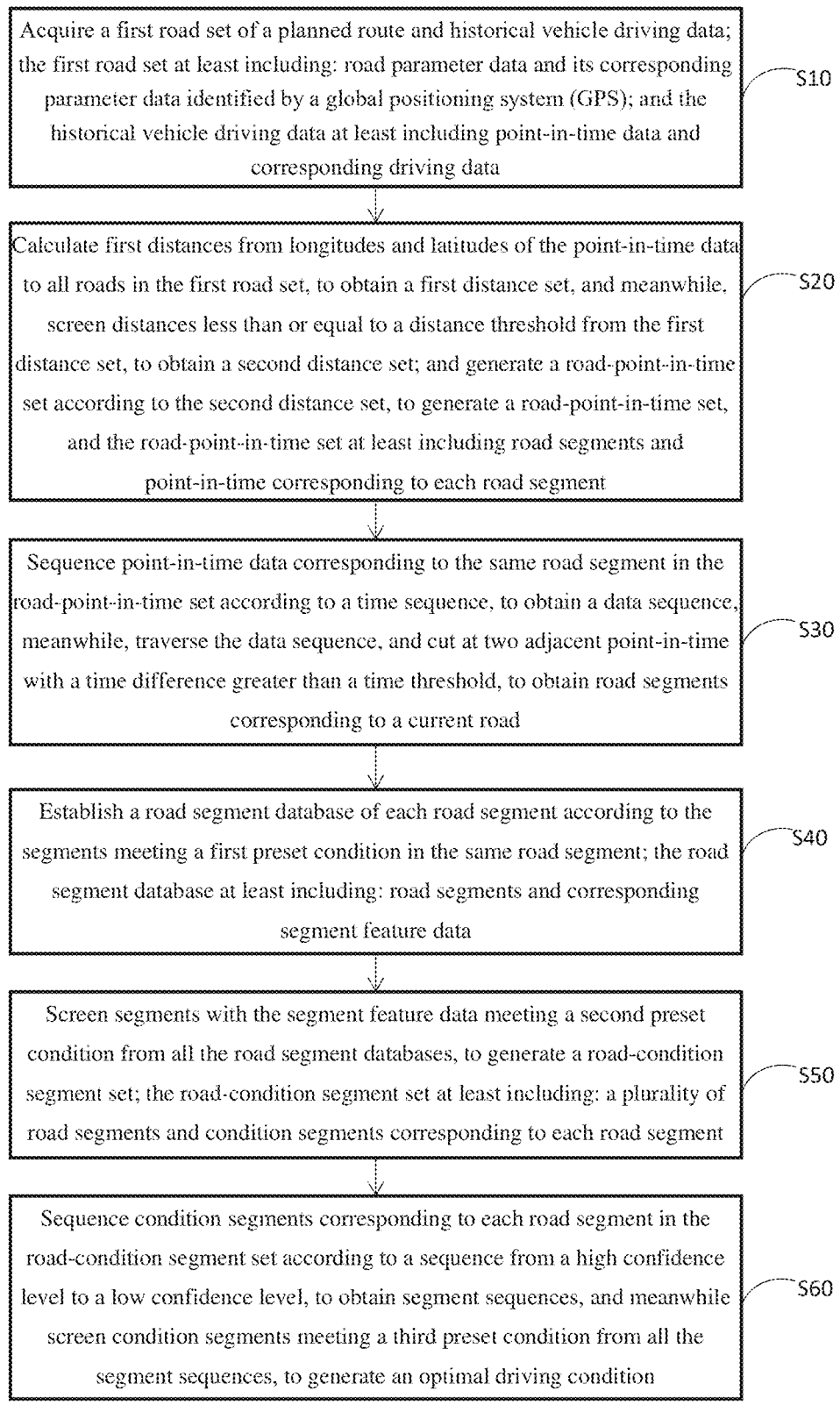
FIG. 1 is a flowchart of a method for constructing a predictive vehicle driving condition.

Reference signs in the drawings: 1: data acquisition module; 2: data processing module;
500: electronic device; 501: central processing unit; 502: ROM (read only memory); 503: RAM (502: read only memory; 503: random access memory); 504: bus; 505: I/O interface; 506: input part; 507: output part; 508: storage part; 509: communication part; 510: driver; and 511: removable medium.

DETAILED DESCRIPTION OF THE EMBODIMENTS

The present disclosure will be further described below with reference to drawings and embodiments. It should be understood that the specific embodiments described herein are merely used for explaining relevant disclosures, instead of limiting the present disclosure. In addition, it should be noted that merely parts related to the present disclosure are shown in the drawings in order to facilitate the description.

It should be noted that the embodiments in the present disclosure and features in the embodiments may be mutually combined without conflicts. The present disclosure will be described in detail below with reference to the drawings and in conjunction with the embodiments.

Embodiment 1

FIG. 1 is a flowchart of a method for constructing a predictive vehicle driving condition. Referring to FIG. 1, the method includes the following steps:

S10, a first road set of a planned route from a map navigation system of a vehicle and retrieving historical vehicle driving data stored in the map navigation system are acquired; wherein the first road set at least includes a plurality of road segments identified by a global positioning system (GPS) and corresponding parameter data; and the historical vehicle driving data at least includes a plurality of point-in-time and corresponding driving data.

Figure 2:
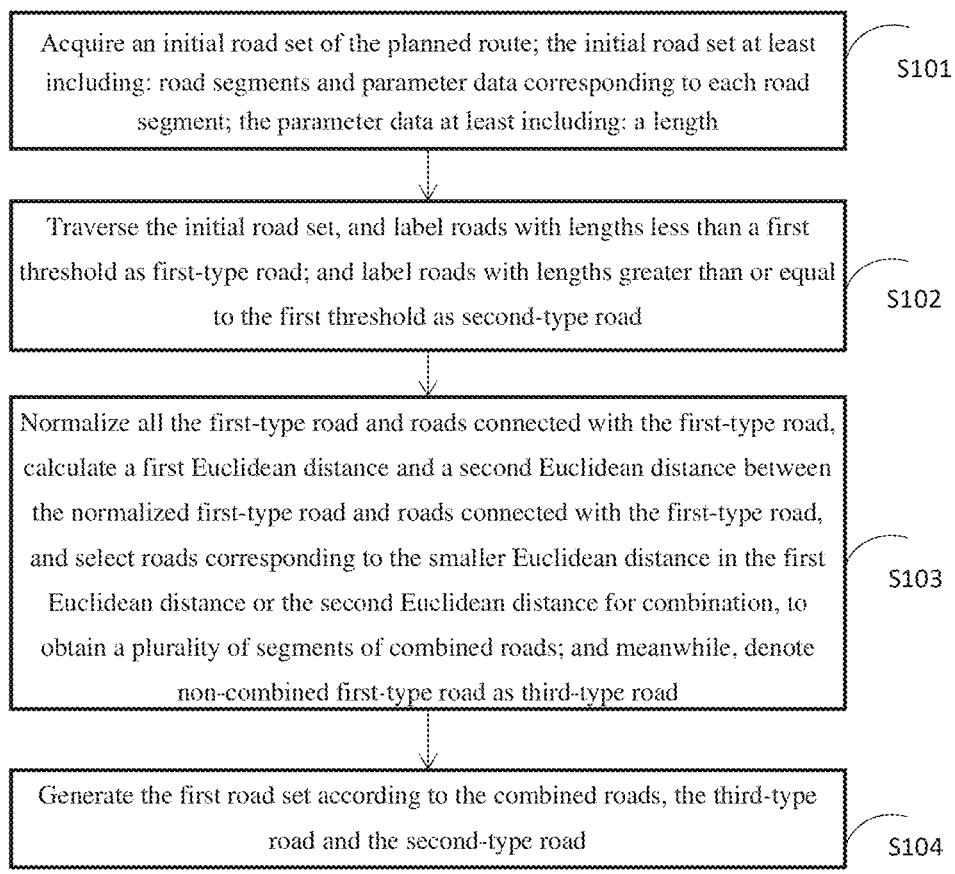
FIG. 2 is a flowchart of acquiring a first road set of a planned route from a map navigation system of a vehicle.

As shown in FIG. 2, the step of acquisition of a first road set of a planned route specifically includes the following steps:

S101, an initial road set of the planned route from a map navigation system of a vehicle is acquired; wherein the initial road set at least includes a plurality of road segments identified by a global positioning system (GPS) and parameter data corresponding to each road segment; the parameter data at least includes a length.

It should be noted that the planned route from a map navigation system of a vehicle refers to a route planned between an origin and a destination after a map navigation system of the vehicle receives the origin and the destination input by a driver, moreover, the map navigation system matches the planned route with a corresponding initial road set, and the initial road set at least includes a plurality of road segments identified by a global positioning system (GPS) and parameter data corresponding to each road segment; and a corresponding road name is designated for each road segment, and the parameter data corresponding to each road segment at least includes a latitude and longitude, a length, an orientation angle, a road grade, the number of lanes, passing time and a mean speed.

Wherein, the latitude and longitude refer to a latitude and longitude corresponding to a road, and the orientation angle may be calculated based on a latitude and longitude of an origin and a destination of a corresponding road; and the mean speed may be calculated based on the length and the passing time. The above road grade mainly refers to a functional grade, which is categorized based on a traffic volume. This grade is determined by intended uses, functions and traffic flow of roads. Roads are classified into five levels: expressways, first-class highways, secondary highways, tertiary highways and fourth-class highways in China (Note: numerical classification is a traditional grade system, with the expressways being an additional category).

S102, the initial road set is traversed, roads with lengths less than a first threshold are labeled as first-type roads, and roads with lengths greater than or equal to the first threshold are labeled as second-type roads;

wherein, the first threshold is, for example, 1 kilometer, which may be set according to actual requirements.

When the road length is less than 1 kilometer, the road segment is labeled as the first-type road, wherein the first-type road is a road with a potential for combination; and when the road length is greater than or equal to 1 kilometer, the road segment is labeled as the second-type road, where the second-type road is a road without combination.

S103, all the first-type roads and roads connected with the first-type roads are normalized, a first Euclidean distance and a second Euclidean distance between the normalized first-type roads and roads connected with the first-type roads are calculated, and roads corresponding to the smaller Euclidean distance in the first Euclidean distance or the second Euclidean distance are selected for combination, to obtain a plurality of segments of combined roads; and meanwhile, first types of non-combined roads are denoted as third-type roads.

Specifically, road grades, the number of lanes and the mean speeds of all the first-type roads are normalized through a max-min normalization method, then the first Euclidean distances and the second Euclidean distances between the normalized first-type roads and roads connected with the first-type roads are calculated, a relationship of the two Euclidean distances is assessed to determine which is smaller, the road corresponding to the smaller Euclidean distance is selected for combining, to obtain the plurality of segments of combined roads; meanwhile, the first types of non-combined roads are denoted as the third-type roads, wherein the third-type roads refer to roads not meeting combination criteria, which are based on the smaller Euclidean distance.

Herein, the Euclidean distance is calculated according to the following formula:

$$d=\sqrt{(x_1-x_2)^2+(y_1-y_2)^2+(z_1-z_2)^2};$$

Where d is the Euclidean distance, $x_1$ is the road grade of the first-type road, $x_2$ is the road grade of the road connected with the first-type road, $y_1$ is the number of lanes of the first-type road, $y_2$ is the number of lanes of the road connected with the first type of road, $z_1$ is the mean speed of the first-type road, and $z_2$ is the mean speed of the road connected with the first-type road.

It should be noted that when the first-type road is a first road segment or a last road segment along the whole planned route, only one road is connected with the first-type road, which does not meet the criteria for selective combination based on a comparison of Euclidean distances, such that when the first-type road is the first road segment or the last road segment along the whole planned route, the road does not need to be combined and is denoted as the third-type road.

S104, the first road set is generated according to the combined roads, the third-type roads and the second-type roads.

Specifically, the first road set is generated by organizing the combined roads, the third-type roads and the second-type roads. It should be noted that parameter data corresponding to the combined roads also needs to be calculated again, and herein, combined parameter data may be obtained by directly aggregating the parameter data such as the latitude and longitude, length, orientation angle, mean speed and passing time.

By normalizing the initial road set of the planned route and combining some roads meeting the combination criteria according to the Euclidean distances, the data volume in the finally-obtained first road set is reduced to a certain degree, and the calculation load can be reduced for subsequent steps.

The historical vehicle driving data stored in the map navigation system refers to driving data acquired during vehicle driving before the vehicle drives along the current planned route, and the driving data includes: a latitude and a longitude, vehicle speed and sampling frequency; wherein the sampling frequency is, for example, 1 Hz; and the point-in-time refer to time corresponding to the acquisition of the driving data.

S20, first distances from longitudes and latitudes of the point-in-time to all roads in the first road set are calculated, measured by a satellite for the GPS to obtain a first distance set, and meanwhile, distances less than or equal to a distance threshold are screened from the first distance set, to obtain a second distance set; and a road-point-in-time set is generated according to the second distance set identified by the GPS; wherein the road-point-in-time set at least includes a plurality of road segments and a plurality of point-in-time corresponding to each road segment;

wherein the distance threshold is, for example, 5 meters, which may be set according to actual requirements.

Specifically, the first distance from one point-in-time to each road segment according to the latitude and longitude corresponding to the point-in-time, to obtain the first distance set, wherein the first distance set includes all the first distances; then the distances less than or equal to 5 meters are screened from the first distance set, to obtain the second distance set, and the second distance set includes all the first distances less than or equal to 5 meters; the corresponding roads and point-in-time are found according to the first distances in the second distance set, to obtain the road-point-in-time set; and the road-point-in-time set includes the plurality of road segments and the plurality of point-in-time corresponding to each road segment.

Herein, the first distance refers to a vertical distance from the latitude and longitude corresponding to each point-in-time to each road segment.

S30, a plurality of point-in-time corresponding to the same road segment in the road-point-in-time set are sequenced according to a time sequence, to obtain a data sequence, meanwhile, the data sequence is traversed, and cutting is performed at two adjacent temporal points with a time difference greater than a time threshold, to obtain a plurality of road segments corresponding to the current road;

wherein the time threshold is, for example, 3 seconds, which may be set according to actual requirements.

In addition, before the road segment database is established, the road segments may be further screened, such that data of the final road segment database is more streamlined, thus achieving the more accurate optimal driving condition. A road segment screening rule here is shown in Table 1. Wherein a in Table 1 denotes an acceleration, a target speed refers to the mean vehicle speed along the corresponding road.

TABLE 1

Road segment screening rule

| Serial number | Parameter | Constraint condition | Comments |
|---|---|---|---|
| 1 | Acceleration | $5.0 \text{ m/s}^2 \le a < 5.0 \text{ m/s}^2$ | Restrict free-fall anomalies in segment |
| 2 | Maximum speed | ≤130 km/h | Delete overspeed segments; anomalies caused by part of drifts of a map navigation system |
| 3 | Mean speed | Error with a target mean speed is less than 5 km/h | Screen a segment close to a target speed |
| 4 | Initial speed of first road segment | <3 km/h | Ensure that a condition starts from vehicle ignition |
| 5 | End speed of last road segment | <3 km/h | Ensure that the condition ends when the vehicle comes to a stop |

Specifically, the plurality of temporal points corresponding to the same road segment in the road-temporal points set are sequenced according to the time sequence, to obtain the data sequence, then, the data sequence is traversed, and cutting is performed at two adjacent temporal points with the time difference greater than 3 seconds, for example, the data sequence in FIG. 6 has two cutting positions, and the three road segments, namely a segment 1, a segment 2 and a segment 3 in FIG. 6, corresponding to the road are obtained.

S40, a road segment database of the road segment is established according to the segments meeting a first preset condition in the same road segment; wherein the road segment database at least includes a plurality of road segments and corresponding segment feature data;

wherein, the first preset condition is as follows:

a difference between a segment orientation angle of the road segment and an orientation angle of a road corresponding to the road segment is less than a first difference, a difference between a segment length of the road segment and a length of the road corresponding to the road segment is less than a second difference, and a difference between a mean vehicle speed of the road segment and a mean vehicle speed of the road corresponding to the road segment is less than a third difference.

It should be noted that the segment orientation angle may be calculated according to the latitude and longitude of the origin and the destination of the road segment, and the segment length may be obtained by integrating a mean vehicle speed of the road segment.

The first difference is, for example, 45 degrees, the second difference is, for example, 10% of the length of the road corresponding to the road segment, the third difference is, for example, 5 km/h, and the first difference, the second difference and the third difference may be set according to actual requirements.

Specifically, the road segment database of the corresponding road is established by means of the segments meeting the first preset condition.

S50, segments with the segment feature data meeting a second preset condition are screened from all the road segment databases, to generate a road-condition segment set; wherein the road-condition segment set at least includes a plurality of road segments and a plurality of condition segments corresponding to each road segment;

wherein the segment feature data at least includes a mean speed of the segment, a mean acceleration of the segment, a mean deceleration of the segment and a confidence level of a speed-acceleration distribution.

The second preset condition is as follows:

A difference between the segment mean speed of the road segment and a target speed of the road corresponding to the road segment is less than a fourth difference, a difference between the mean acceleration of the road segment and a mean acceleration of the road corresponding to the road segment is less than a fifth difference, a difference between the mean deceleration of the road segment and a mean deceleration of the road corresponding to the road segment is less than a sixth difference, and the confidence level of the road segment is greater than a preset confidence level.

Herein, the fourth difference is, for example, 10% of the mean speed of the road corresponding to the road segment, the fifth difference is, for example, 10% of the mean acceleration of the road corresponding to the road segment, the sixth difference is, for example, 10% of the mean deceleration of the road corresponding to the road segment, the preset confidence level is, for example, 95%, and moreover, the fourth difference, the sixth difference, the sixth difference and the preset confidence level may be set according to actual requirements.

Herein, the acceleration of the road segment is calculated according to the following formula:

$$a_i = (v_{i+1} - v_{i-1})/7.2;$$

Where $a_i$ is an acceleration at an $i^{th}$ second, with a unit of m/s$^2$; $v_{i+1}$ is a speed at an $(i+1)^{th}$ second, with a unit of m/s; and $v_{i-1}$ is a speed at an $(i-1)^{th}$ second, with a unit of m/s.

Wherein the speed-acceleration distribution is a two-dimensional matrix, which refers to weight proportions of different speeds and different accelerations. Herein, the speed-acceleration distribution includes a speed interval, which is, for example, 0-130 km/h, and an interval, which is, for example, 5 km/h; and an acceleration interval, which is, for example, −4.5 m/s$^2$-4.5 m/s$^2$, and an interval, which is, for example, 0.1 m/s$^2$.

Furthermore, the confidence level of the speed-acceleration distribution is acquired according to the following steps:

a chi-square value of the speed-acceleration distribution is calculated;

specifically, the chi-square value of the speed-acceleration distribution is calculated according to the following formula:

$$X^2 = \sum \frac{(va_{i,j} - VA_{i,j})^2}{VA_{i,j}}, i = 1, 2, \ldots, n; j = 1, 2, \ldots, m;$$

where $X^2$ is the chi-square value, $va_{i,j}$ is a value of an $i^{th}$ interval of the segment speed and a $j^{th}$ interval of the segment acceleration for the road segment, $VA_{i,j}$ is a value of an $i^{th}$ interval of a speed and a $j^{th}$ interval of the acceleration for the road segment database, n is the number of intervals of the speed in the speed-acceleration distribution, and m is the number of intervals of the acceleration in the speed-acceleration distribution.

A corresponding chi-square distribution database is acquired according to a freedom degree of the speed-acceleration distribution; the chi-square distribution database at least includes a plurality of chi-square values and corresponding confidence levels;

wherein the freedom degree of the speed-acceleration distribution is, for example, 2, and the corresponding chi-square distribution database is shown in Table 2.

TABLE 2

| Chi-square distribution database corresponding to freedom degree of 2 | | | | |
|---|---|---|---|---|
| Confidence level | 99% | 97.50% | 95% | 90% |
| Chi-square value | 0.02 | 0.051 | 0.103 | 0.211 |

The chi-square distribution database is searched for the confidence level corresponding to data corresponding to chi-square values, which serves as the confidence level of the speed-acceleration distribution.

S60, a plurality of condition segments corresponding to each road segment in the road-condition segment set are sequenced according to a sequence from high confidence level to low confidence level, to obtain a plurality of segment sequences, and meanwhile condition segments meeting a third preset condition are screened from all the segment sequences, to generate an optimal driving condition; and outputting the optimal driving condition to a display and applying the optimal driving condition to drive the vehicle.

Furthermore, after obtaining the plurality of segment sequences and before screening the condition segments meeting the third preset condition from all the segment sequences, the method further includes the following steps:

the roads are sequenced according to the planned route, to obtain a road sequence; and the condition segments meeting the third preset condition are screened from all the segment sequences according to the road sequence; the third preset condition is defined as follows: a speed difference between the condition segments of two adjacent road segments is less than a preset speed difference.

Wherein, the condition segments meeting the third preset condition may be screened from all the segment sequences through a backtracking method.

The backtracking method refers to a method that when it is found that a direction of a certain combination does not meet conditions, the algorithm will no longer continue to proceed, but instead retraces to a previous level to continue searching for alternative routes, thereby shortening algorithm running time.

Figure 3:
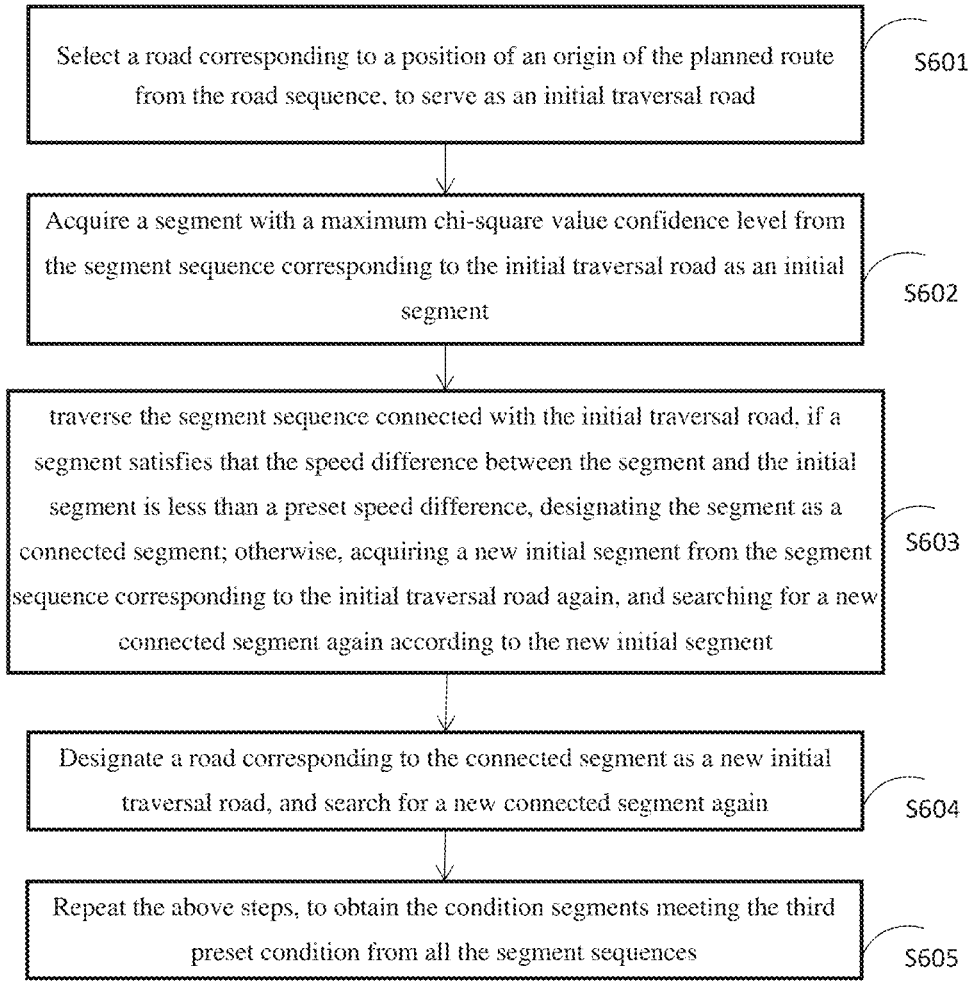
FIG. 3 is a flowchart of screening condition segments meeting a third preset condition from all segment sequences.

Specifically, as shown in FIG. 3, the screening of condition segments meeting a third preset condition from all the segment sequences according to the road sequence specifically includes the following steps:

S601, a road corresponding to a position of an origin of the planned route is selected from the road sequence, to serve as an initial traversal road;

S602, a segment with a maximum chi-square value confidence level is acquired from the segment sequence corresponding to the initial traversal road, to serve as an initial segment;

S603, the segment sequence of the road connected with the initial traversal road is traversed, and if a segment satisfies that the speed difference between the segment and the initial segment is less than a preset speed difference, the segment is designated as a connected segment; otherwise, a new initial segment is acquired again from the segment sequence corresponding to the initial traversal road, and a new connected segment is searched again according to the new initial segment;

wherein, the speed difference is, for example, 5 km/h, and the preset speed difference may be set according to actual requirements;

S604, a road corresponding to the connected segment is denoted as a new initial traversal road, and a new connected segment is searched again; and S605, the above steps are repeated, to obtain the condition segments meeting the third preset condition from all the road segments.

Taking a route from a certain university to a certain Waterworks Group as an example, a driver inputs an origin of the university and a destination of the Waterworks Group through a map navigation system of a vehicle, and the map navigation system generates a planned route according to the origin and the destination, and matches the planned route with a corresponding initial road set. Data in the initial road set is shown in Table 3. It should be noted that due to long latitude and longitude data, ellipses are used in Table 3 instead of listing all the latitude and longitude data.

TABLE 3

Data of initial road set

| Road serial number | Road name | Road length (km) | Orientation angle (°) | Road grade | Number of lanes | Passing time (sec) | Mean speed (km/h) | Latitude and longitude |
|---|---|---|---|---|---|---|---|---|
| 1 | Weijin Road | 1.4 | 180 | 3 | 3 | 117 | 35 | 117.179138, 39.10815 . . . |
| 2 | Water Park North Road | 0.42 | 272 | 3 | 3 | 80 | 19 | 117.179428, 39.10815 . . . |
| 3 | Water Park East Road | 1.61 | 283 | 3 | 4 | 145 | 40 | 117.179169, 339.09587 . . . |
| 4 | Lingbin Road | 1.1 | 282 | 3 | 4 | 113 | 35 | 117.179382, 39.085062 . . . |

Roads shorter than 1 kilometer in the initial road set are denoted as first-type roads, roads longer than or equal to 1 kilometer are denoted as second-type roads, the first-type roads include Weijin Road, Water Park North Road and Water Park East Road, and the second-type roads include Lingbin Road.

The first-type roads are normalized through a max-min normalization method, and herein, parameter data of the normalized first-type roads is shown in Table 4.

TABLE 4

Parameter data of normalized first-type roads

| Road serial number | Road name | Number of lanes | Road grade | Mean speed |
|---|---|---|---|---|
| 1 | Weijin Road | 0 | 0 | 0.76 |
| 2 | Water Park North Road | 0 | 0 | 0 |
| 3 | Water Park East Road | 1 | 0 | 1 |

Then, Euclidean distances from the normalized first-type roads to roads connected with the normalized first-type roads are calculated, wherein the Euclidean distance from Weijin Road to Water Park North Road is 0.76, the Euclidean distance from Water Park North Road to Water Park East Road is 1.414, since the Euclidean distance from Weijin Road to Water Park North Road is shorter, Weijin Road and Water Park North Road are combined and denoted as a combined road named Merging Road 1, and Water Park East Road is a third type of road; and a first road set is finally obtained, as shown in Table 5.

TABLE 5

First road set

| Road serial number | Road name | Road length (km) | Orientation angle (°) | Mean speed (km/h) | Passing time (sec) | Latitude and longitude |
|---|---|---|---|---|---|---|
| 1 | Merging Road 1 | 1.82 | 197 | 29.30 | 197 | 117.179138, 39.10815 . . . |
| 2 | Water Park East Road | 1.61 | 283 | 40.00 | 145 | 117.179169, 339.09587 . . . |
| 3 | Lingbin Road | 1.1 | 282 | 35.00 | 113 | 117.179382, 39.085062 . . . |

Furthermore, historical vehicle driving data stored in the map navigation system is acquired, first distances from corresponding temporal points to corresponding roads are calculated according to a latitude and longitude corresponding to each point-in-time, to obtain a first distance set, then distances less than or equal to 5 meters are screened from the first distance set, to obtain a second distance set, and corresponding roads and point-in-time are found according to the first distances in the second distance set, to generate a road-point-in-time set. As shown in FIG. 6, a plurality of point-in-time corresponding to the same road segment in the road-point-in-time set are sequenced according to a time sequence, to obtain a data sequence, then, the data sequence is traversed, and cutting is performed at two adjacent point-in-time with the time difference greater than 3 seconds, that is, the data sequence in FIG. 6 is divided into three road segments, namely a segment 1, a segment 2 and a segment 3 in FIG. 6.

Furthermore, segments corresponding to the same road segment are selected according to the first preset condition and the road segment screening rule in Table 1, and road segment databases of the above three road segments are established; then segments with segment feature data meeting the second preset condition are screened from the above three road segment databases, to generate a road-condition segment set; and a plurality of condition segments corresponding to each road segment in the road-condition segment set are sequenced according to a sequence from high confidence level to low confidence level, to obtain a plurality of segment sequences, and meanwhile, condition segments meeting the third preset condition are screened from all the segment sequences, to obtain an optimal driving condition; and outputting the optimal driving condition to a display and applying the optimal driving condition to drive the vehicle.

Specifically, the sequence of the three roads is Merging Road 1, Water Park East Road and Lingbin Road according to the planned route. In order to better distinguish the three segment sequences, it is set that the segment sequence of Merging Road 1 is a segment database of Road 1, a segment sequence of Water Park East Road is a segment database of Road 2, the segment sequence of Lingbin Road is a segment database of Road 3, correspondingly, segments in the segment database of Road 1 are Segment 1 of Road 1, Segment 2 of Road 1, Segment 3 of Road 1 and the like, segments in the segment database of Road 2 are Segment 1 of Road 2, Segment 2 of Road 2, Segment 3 of Road 2 and the like, and segments in the segment database of Road 3 are Segment 1 of Road 3, Segment 2 of Road 3, Segment 3 of Road 3 and the like.

Figure 7:
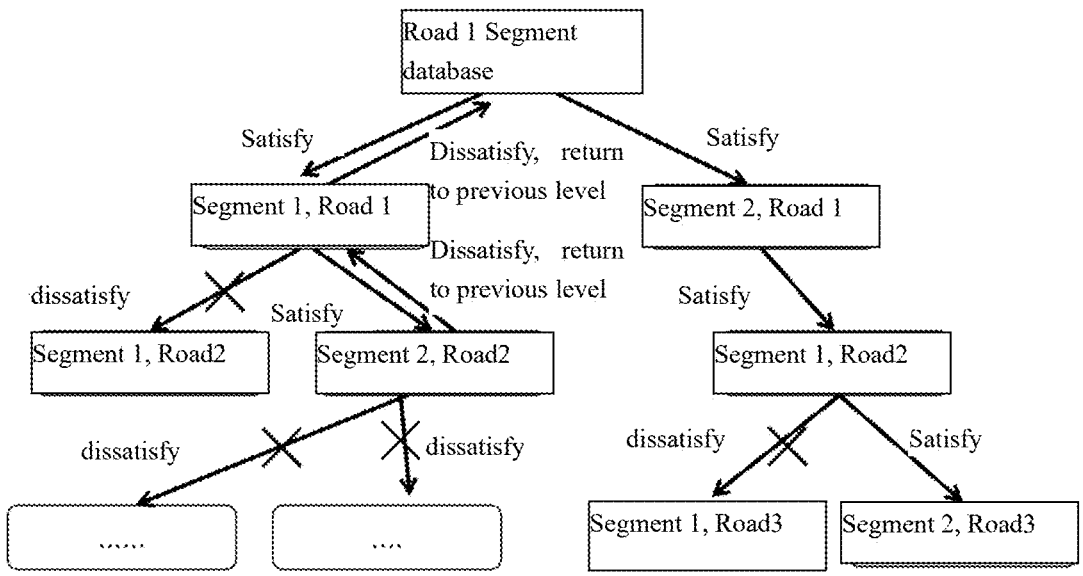
FIG. 7 is a schematic diagram of generating an optimal driving condition.

As shown in FIG. 7, the initial traversal road is Merging Road 1, the Segment 1 of Road 1 is selected as the initial segment, the segment database of Road 2 of Water Park East Road is traversed, segments with a speed difference of less than 5 km/h from the Segment 1 of Road 1 are searched one by one, if none of segments in the segment database of Road 2 meets the condition, the algorithm returns to the segment database of Road 1, the Segment 2 of Road 1 is selected as the initial segment, the segment database of Road 2 of Water Park East Road is traversed again, segments with a speed difference of less than 5 km/h from the Segment 2 of Road 1 are searched one by one, if the Segment 1 of Road 2 meets the condition, the Segment 1 of Road 2 is used as the initial segment, the segment database of Road 3 is traversed to search for segments with a speed difference of less than 5 km/h from the Segment 1 of Road 2 one by one, and in this way, the optimal driving condition is finally generated.

Figure 8:
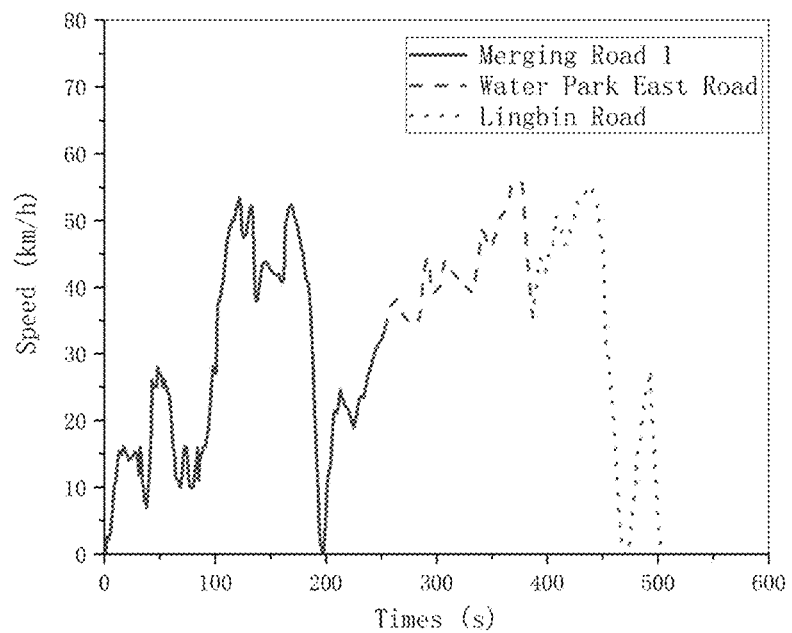
FIG. 8 is a data curve diagram of an optimal driving condition.

Wherein, FIG. 8 is a data curve diagram of the optimal driving condition. Table 6 shows data features corresponding to the optimal driving condition; and the speed of the vehicle driving condition in Table 6 refers to a mean of speeds of each road segment in FIG. 8, a target speed refers to mean vehicle speeds of the roads in the first road set, and a speed deviation refers to a deviation between the target speed and the speed of the vehicle driving condition for the same road segment.

TABLE 6

Data features corresponding to optimal driving condition

| Road number | Target speed (km/h) | Speed of vehicle driving condition (km/h) | Speed deviation (km/h) | Percent (%) |
|---|---|---|---|---|
| 1 | 29.30 | 27.80 | −1.50 | −5.12% |
| 2 | 40.00 | 42.00 | 2.00 | 5.00% |
| 3 | 35.00 | 36.00 | 1.00 | 2.86% |
| Overall feature | 35.84 | 33.72 | −2.12 | −5.92% |

According to the present disclosure, the driver inputs the origin and the destination, to obtain the planned route, the corresponding parameter data is matched for the planned route, namely real-time information, then driving habits and driving features of the driver are reflected based on the historical vehicle driving data stored in the map navigation system, richer reference information is provided for constructing the vehicle driving condition, moreover, during the process of constructing the optimal driving condition, the road segment database corresponding to each road segment is finally generated by combining some roads, and cutting and screening the road segments. This results in more reduced data in the road segment databases, which significantly reduces the calculation load and error rate during the construction process, and ensures that the final optimal driving condition is more accurate.

Consequently, the improvement in the vehicle driving range prediction algorithm and the predictive vehicle energy management strategy are effectively supported. In addition, the condition segments are searched in a backtracking mode, such that algorithm running time can also be shortened.

Embodiment 2

Figure 4:
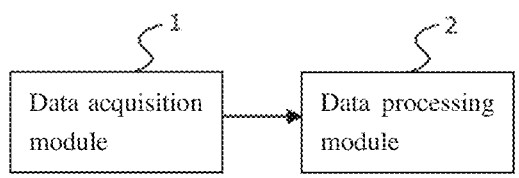
FIG. 4 is a schematic structural diagram of a system for constructing a predictive vehicle driving condition.

The present disclosure provides a system for constructing a predictive vehicle driving condition, which can achieve the method for constructing the predictive vehicle driving condition in Embodiment 1. As shown in FIG. 4, the system includes:

a data acquisition module 1, configured to acquire a first road set of a planned route from a map navigation system of a vehicle and retrieving historical vehicle driving data stored in the map navigation system; the first road set at least including: a plurality of road segments and corresponding parameter data; historical vehicle driving data at least including: a plurality of point-in-time and corresponding driving data;

a data processing module 2, configured to calculate first distances from longitudes and altitudes corresponding to the point-in-time to all roads in the first road set, measured by a satellite for the GPS to obtain a first distance set, and meanwhile, screen distances less than or equal to a distance threshold from the first distance set, to obtain a second distance set; and generate a road-point-in-time set according to the second distance set identified by the GPS, to obtain a road-point-in-time set; the road-point-in-time set at least including a plurality of road segments and a plurality of point-in-time corresponding to each road segment;

the data processing module 2, further configured to sequence a plurality of point-in-time corresponding to the same road segment in road-point-in-time set according to a time sequence, to obtain a data sequence, meanwhile, traverse the data sequence, and cut at two adjacent point-in-time with a time difference greater than a time threshold, to obtain a plurality of road segments corresponding to a current road;

the data processing module 2, further configured to establish a road segment database of the road segment according to the segments meeting a first preset condition in the same road segment; the road segment database at least including: a plurality of road segments and corresponding segment feature data;

the data processing module 2, further configured to screen segments with the segment feature data meeting a second preset condition from all the road segment databases, to generate a road-condition segment set; wherein the road-condition segment set at least includes a plurality of road segments and a plurality of condition segments corresponding to each road segment; and the data processing module 2, further configured to sequence a plurality of condition segments corresponding to each road segment in the road-condition segment set according to a sequence from a high confidence level to a low confidence level, to obtain a plurality of segment sequences, and meanwhile, screen condition segments meeting a third preset condition from all the segment sequences, to generate an optimal driving condition; and outputting the optimal driving condition to a display and applying the optimal driving condition to drive the vehicle.

Wherein, a type of the data acquisition module 1 is, for example, an SJBQ-CJ multi-channel data acquisition apparatus; and a type of the data processing module 2 is, for example, an electronic control unit (ECU).

Embodiment 3

An electronic device includes a memory, a processor, and a computer program stored in the memory and capable of running on the processor, and when implementing the computer programs, the processor implements the steps of the method for constructing the predictive vehicle driving condition in the above embodiment.

Figure 5:
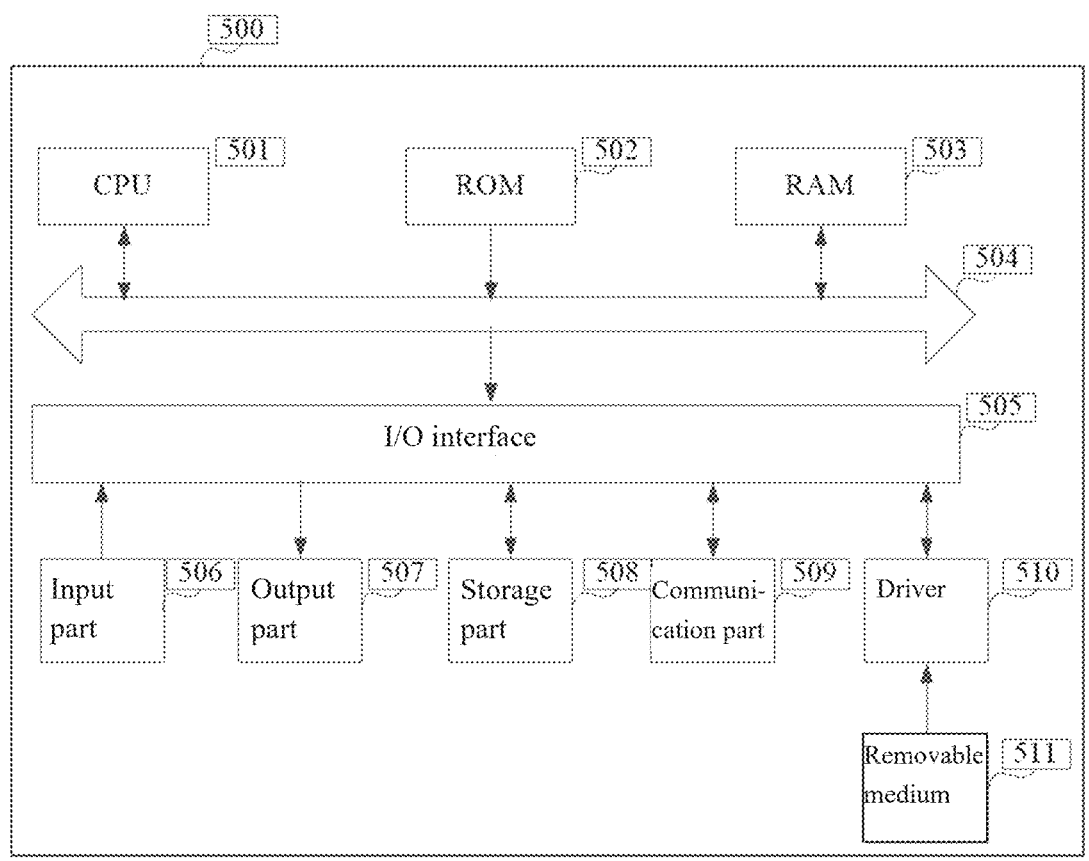
FIG. 5 is a schematic structural diagram of an electronic device.

In this embodiment, as shown in FIG. 5, the electronic device 500 includes a CPU 501, which can implement various appropriate actions and processes according to programs stored in an ROM 502 or programs loaded from a storage part into an RAM 503. Various programs and data needed by system operations are also stored in the RAM 503. The CPU 501, the ROM 502 and the RAM 503 are interconnected through a bus 504. An I/O interface 505 is also connected to the bus 504.

The following components are connected to the I/O interface 505, including an input part 506 such as a keyboard and a mouse; including an output part 507 such as a cathode ray tube (CRT), a liquid crystal display (LCD) and a loudspeaker; including the storage part 508 such as a hard disk; and including a communication part 509 of a network interface card such as a local area network (LAN) card and a modem. The communication part 509 addresses communication processing via a network such as the Internet. A driver also needs to be connected to the I/O interface 505 as required. A removable medium 511, such as a magnetic disk, an optical disk, a magneto-optical disk and a semiconductor memory, is installed on the driver 510 as required, so as to conveniently install a computer program read therefrom into the storage part 508 as required.

Particularly, according to the embodiments of the present disclosure, the above may be implemented as a computer software program with reference to the process described in the flowchart 1. For example, an embodiment 3 of the present disclosure includes a computer program product, including a computer program contained on a computer readable medium, and the computer program contains program codes used for executing the method shown in the flowchart. In such embodiment, the computer program may be downloaded and installed from at least of a network via the communication part or the removable medium. When the computer program is executed by the CPU 501, the above functions limited in the system of the present disclosure are executed.

It should be noted that the compute readable medium shown in the present disclosure may be a computer readable signal medium or computer readable storage medium or any combination of both. The computer readable storage medium may be, for example, but is not limited to an electrical, magnetic, optical, electromagnetic, infrared, or semiconductor system, apparatus or device, or any combination of the above. More specific examples of the computer readable storage medium may include but are not limited to: an electric connection with one or more wires, a portable computer disk, a hard disk, a random access memory (RAM), a read only memory (ROM), an erasable programmable read-only memory (EPROM) or flash memory, an optical fiber, a portable compact disk-read only memory (CD-ROM), a light storage device, a magnetic storage device, or any appropriate combination of the above. In the present disclosure, the computer readable storage medium may be any tangible medium containing or storing a program, and the program may be used by an instruction executing system, apparatus or device or used in combination with them. In the present disclosure, the computer readable signal medium may include a data signal propagating in a bandwidth or propagating as part of a carrier wave, with computer readable program codes encoded therein. The data signal propagating in this way may be in a plurality of forms, including but not limited to an electromagnetic signal, an optical light or any appropriate combination of the above. The computer readable signal medium may further be any computer readable medium besides the computer readable storage medium, and the computer readable medium may send, propagate or transmit programs used by the instruction executing system, apparatus or device or used in combination with them. The program codes contained in the computer readable medium may be transmitted by any appropriate medium, including but not limited to wireless, wire, optical cable, RF, etc., or any appropriate combination of the above.

The flowchart and the block diagram in the figures illustrate system architecture, functions and operations probably implemented by systems, methods and computer program products according to various embodiments of the present disclosure. In this regard, each block in the flowchart or the block diagram may represent part of one module, program segment or code, and the part of the module, program segment or code contains one or more executable instructions used for implementing specified logic functions. It should be noted that in some implementations as substitutions, functions marked in the blocks may also occur in a sequence different from the sequence marked in the figures. For example, two consecutively indicated blocks actually may be executed basically in parallel, and they may also be implemented in opposite sequences sometimes, which is determined according to involved functions. It should also be noted that each block in the block diagram or the flowchart and a combination of the blocks in the block diagram or the flowchart may be implemented by a specialized hardware-based system that executes specified functions or operations, or may be implemented by a combination of the specialized hardware and computer instructions.

Units involved in the embodiments of the present disclosure may be implemented through either software or hardware, and the described units may also be arranged in the processor. Wherein, names of these units do not construe limitations to the units themselves in certain cases. The described units or modules may also be arranged in the processor.

Embodiment 4

The present disclosure further provides a computer readable storage medium, which may be contained in the electronic device described in the above embodiment and may also be an independent computer readable storage medium not assembled into the electronic device. The computer readable medium contains one or more programs, and when the above one or more programs are executed by one electronic device, the electronic device implements the method for constructing the predictive vehicle driving condition in the above embodiment.

The driving modes of the vehicle are generally divided into three modes: ECO mode, NORMAL mode, and SPORT mode, the three modes optimize energy efficiency and driving experience of the vehicle according to different driving requirements and power output characteristics. The power application range may be adjusted according to different vehicle models, configurations of the power system, and different driving requirements.

Wherein, ECO mode aims to improve fuel economy and reduce fuel consumption of the vehicle. In the ECO mode, the engine may operate more energy-saving, the power output may be limited to a certain extent, and the acceleration response of the vehicle may become smoother. Power Applicable Interval: less than 10% of maximum Power.

Normal mode: in this mode, the vehicle provides moderate power output and driving experience, and is suitable for daily driving requirements. Power Application interval ranges 10% to 20% maximum power interval.

SPORT mode focuses on promoting the dynamic of driving and the acceleration performance of the vehicle. In this mode, the engine will more aggressively respond to the input of the accelerator pedal, providing a stronger power output. However, the SPORT mode also increases the fuel consumption of the vehicle. Power applicable interval: greater than 20% maximum power interval.

Based on the obtained optimal driving condition of planned route, the average vehicle traction power requirement of the planned route is calculated; wherein the traction power requirement refers to the power required by the vehicle to maintain the motion requirement of the vehicle, and energy consumption of the vehicle accessory such as air-conditioning and audio-video are not included.

And calculation formula of the traction power requirement is as follows:

$$F_i = Gf + \frac{C_D A}{21.15} u_i^2 + \delta m a_i$$

$$P_i = F_i \times v_i$$

$$\overline{P} = \frac{\sum_{i=1}^{N} P_i}{N}$$

wherein $F_i$ is the vehicle traction force of the $i^{th}$ second, G is the vehicle gravity, f is the vehicle rolling friction coefficient, $C_D$ is the air resistance coefficient, A is the vehicle windward area; $v_i$ is the speed of the $i^{th}$ second in the optimal driving condition, $\delta$ is the rotation quality coefficient, m is the vehicle quality, $\alpha_i$ is the acceleration of the $i^{th}$ second in the optimal driving condition, $P_i$ is the traction rate power requirement of the $i^{th}$ second in the optimal driving condition, N is the time length of the optimal driving condition, and $\overline{P}$ is the average traction power requirement.

The obtained average traction power requirement is then compared with the power output intervals in different driving modes according to the power value, so as to select the most suitable vehicle driving mode to optimize the balance between vehicle performance and energy consumption.

The above description is only the preferred embodiment of the present disclosure and the explanation of the applied technical principles. It should be understood for those skilled in the art that the scope involved in the present disclosure is not limited to the technical solutions made by specifically combining the above technical characteristics, but also covers other technical solutions made by any combination of the above technical characteristics or equivalent characteristics thereof without departing from the concept of the present disclosure, for example, the technical solutions made by exchanging the above characteristics with the technical characteristics disclosed in the present disclosure (but not limited to) having similar functions.

What is claimed is:

1. A method for constructing a predictive vehicle driving condition, including the following steps:

acquiring a first road set of a planned route and historical vehicle driving data; wherein the first road set at least includes a plurality of road parameter data and its corresponding parameter data identified by a global positioning system (GPS); and the historical vehicle driving data at least includes a plurality of point-in-time data and corresponding driving data;

calculating first distances from longitudes and latitudes of the point-in-time data to all roads in the first road set so as to obtain a first distance set; and meanwhile, screening distances less than or equal to a distance threshold from the first distance set so as to obtain a second distance set; generating a road-point-in-time set according to the second distance set, wherein the roadpoint-in-time set at least includes a plurality of road segments and a plurality of point-in-time corresponding to each road segment;

sequencing the plurality of point-in-time data corresponding to the same road segment in the road-point-in-time set according to a time sequence so as to obtain a data sequence; meanwhile, traversing the data sequence, and cutting at two adjacent point-in-time with a time difference greater than a time threshold so as to obtain a plurality of road segments corresponding to a current road;

establishing a road segment database of each road segment according to the segments meeting a first preset condition in the road segment; wherein the road segment database at least includes the plurality of road segments and corresponding segment feature data;

screening segments with the segment feature data meeting a second preset condition from all the road segment databases so as to generate a road-condition segment set, wherein the road-condition segment set at least includes a plurality of road segments and a plurality of condition segments corresponding to each road segment; and sequencing the plurality of condition segments corresponding to each road segment in the road-condition segment set according to a sequence from a high confidence level to a low confidence level so as to obtain a plurality of segment sequences; and meanwhile, screening condition segments meeting a third preset condition from all the segment sequences to generate an optimal driving condition.

2. The method for constructing a predictive vehicle driving condition according to claim 1, wherein the step of acquiring a first road set of a planned route comprise:

traversing the first road set, and labeling roads with lengths less than a first threshold as first-type roads; labeling roads with lengths greater than or equal to the first threshold as second-type roads;

normalizing all the first-type roads and roads connected with the first-type roads, calculating a first Euclidean distance and a second Euclidean distance between the normalized first-type roads and roads connected with the first-type roads, and selecting roads corresponding to the smaller Euclidean distance in the first Euclidean distance or the second Euclidean distance for combination, to obtain a plurality of segments of combined roads; meanwhile, denoting non-combined first-type roads as third-type roads; and generating the first road set according to the combined roads, the third-type roads and the second-type roads.

3. The method for constructing a predictive vehicle driving condition according to claim 1, wherein the first preset condition comprises:

a difference between a segment orientation angle of the road segment and an orientation angle of a road corresponding to the road segment is less than a first difference, and a difference between a segment length of the road segment and a length of the road corresponding to the road segment is less than a second difference.

4. The method for constructing a predictive vehicle driving condition according to claim 1, wherein the segment feature data at least includes: a mean speed of the segment, a mean acceleration of the segment, a mean deceleration of the segment and a confidence level of a speed-acceleration distribution;

the second preset condition comprises:

a difference between the mean acceleration of the road segment and a mean acceleration of the road corresponding to the road segment is less than a fifth difference, a difference between the mean deceleration of the road segment and a mean deceleration of the road corresponding to the road segment is less than a sixth difference, and the confidence level of the road segment is greater than a preset confidence level.

5. The method for constructing a predictive vehicle driving condition according to claim 4, wherein the confidence level of the speed-acceleration distribution is acquired according to the following steps:

calculating a chi-square value of the speed-acceleration distribution;

acquiring a corresponding chi-square distribution database according to a freedom degree of the speed-acceleration distribution; wherein the chi-square distribution database at least includes a plurality of chi-square values and corresponding confidence levels; and searching the confidence level corresponding to data associated with the chi-square values in the chi-square distribution database, which serves as the confidence level of the speed-acceleration distribution.

6. An electronic device, including a memory, a processor and computer programs stored on the memory and capable of running on the processor, wherein, the processor implements the steps of a method for constructing the predictive vehicle driving condition, the method comprising the following steps:

acquiring a first road set of a planned route and historical vehicle driving data; wherein the first road set at least includes a plurality of road parameter data and its corresponding parameter data identified by a global positioning system (GPS); and the historical vehicle driving data at least includes a plurality of point-in-time data and corresponding driving data;

calculating first distances from longitudes and latitudes of the point-in-time data to all roads in the first road set so as to obtain a first distance set; and meanwhile, screening distances less than or equal to a distance threshold from the first distance set so as to obtain a second distance set; generating a road-point-in-time set according to the second distance set, wherein the road-point-in-time set at least includes a plurality of road segments and a plurality of point-in-time corresponding to each road segment;

sequencing the plurality of point-in-time data corresponding to the same road segment in the road-point-in-time set according to a time sequence so as to obtain a data sequence;

meanwhile, traversing the data sequence, and cutting at two adjacent point-in-time with a time difference greater than a time threshold so as to obtain a plurality of road segments corresponding to a current road;

establishing a road segment database of each road segment according to the segments meeting a first preset condition in the road segment; wherein the road segment database at least includes the plurality of road segments and corresponding segment feature data;

screening segments with the segment feature data meeting a second preset condition from all the road segment databases so as to generate a road-condition segment set, wherein the road-condition segment set at least includes a plurality of road segments and a plurality of condition segments corresponding to each road segment; and sequencing the plurality of condition segments corresponding to each road segment in the road-condition segment set according to a sequence from a high confidence level to a low confidence level so as to obtain a plurality of segment sequences; and meanwhile, screening condition segments meeting a third preset condition from all the segment sequences to generate an optimal driving condition.

7. The electronic device of claim 6, wherein the step of acquiring a first road set of a planned route comprises the following steps:
traversing the first road set, and labeling roads with lengths less than a first threshold as first-type roads; labeling roads with lengths greater than or equal to the first threshold as second-type roads;
normalizing all the first-type roads and roads connected with the first-type roads, calculating a first Euclidean distance and a second Euclidean distance between the normalized first-type roads and roads connected with the first-type roads, and selecting roads corresponding to the smaller Euclidean distance in the first Euclidean distance or the second Euclidean distance for combination, to obtain a plurality of segments of combined roads; meanwhile, denoting non-combined first-type roads as third-type roads; and
generating the first road set according to the combined roads, the third-type roads and the second-type roads.

8. The electronic device of claim 6, wherein the first preset condition comprises:
a difference between a segment orientation angle of the road segment and an orientation angle of a road corresponding to the road segment is less than a first difference, and a difference between a segment length of the road segment and a length of the road corresponding to the road segment is less than a second difference.

9. The electronic device of claim 6, wherein the segment feature data at least includes: a mean speed of the segment, a mean acceleration of the segment, a mean deceleration of the segment and a confidence level of a speed-acceleration distribution;
the second preset condition comprises:
a difference between the mean acceleration of the road segment and a mean acceleration of the road corresponding to the road segment is less than a fifth difference, a difference between the mean deceleration of the road segment and a mean deceleration of the road corresponding to the road segment is less than a sixth difference, and the confidence level of the road segment is greater than a preset confidence level.

10. The electronic device of claim 9, wherein the confidence level of the speed-acceleration distribution is acquired according to the following steps:
calculating a chi-square value of the speed-acceleration distribution;
acquiring a corresponding chi-square distribution database according to a freedom degree of the speed-acceleration distribution; wherein the chi-square distribution database at least includes a plurality of chi-square values and corresponding confidence levels; and
searching the confidence level corresponding to data associated with the chi-square values in the chi-square distribution database, which serves as the confidence level of the speed-acceleration distribution.

\* \* \* \* \*